United States Patent
Huber et al.

(10) Patent No.: US 10,220,862 B2
(45) Date of Patent: Mar. 5, 2019

(54) METHOD FOR OPERATING A TRANSPORT ASSEMBLY IN THE FORM OF A LINEAR STATOR LINEAR MOTOR

(71) Applicant: B&R INDUSTRIAL AUTOMATION GMBH, Eggelsberg (AT)

(72) Inventors: Stefan Huber, Salzburg (AT); Helmut Herzog, Salzburg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 95 days.

(21) Appl. No.: 15/422,055

(22) Filed: Feb. 1, 2017

(65) Prior Publication Data

US 2017/0217460 A1    Aug. 3, 2017

(30) Foreign Application Priority Data

Feb. 2, 2016 (AT) .............................. A 50058/2016

(51) Int. Cl.
*B60L 13/03*    (2006.01)
*B61L 23/14*    (2006.01)
(Continued)

(52) U.S. Cl.
CPC .............. *B61L 23/34* (2013.01); *B60L 13/03* (2013.01); *B61L 23/14* (2013.01); *B61L 25/021* (2013.01);
(Continued)

(58) Field of Classification Search
CPC ........ B61L 23/34; B61L 23/14; B61L 25/021; B61L 25/025; B60L 13/03; H02P 6/00;
(Continued)

(56) References Cited

U.S. PATENT DOCUMENTS 8,527,092 B2 *  9/2013  Hacker .................. B25J 9/1641
                                                    700/1
8,863,669 B2 * 10/2014  Young ................... B60L 15/005
                                                    104/292
(Continued)

FOREIGN PATENT DOCUMENTS

DE       197 18 840       10/1998
JP       S63-52607        3/1988
(Continued)

OTHER PUBLICATIONS

Austria Search Report conducted in counterpart Austria Appln. No. A50058/2016 (dated Jan. 27, 2017).
Europe Search Report conducted in counterpart Europe Appln. No. 17 15 2998 (dated Jun. 16, 2017).

*Primary Examiner* — Jason C Smith
(74) *Attorney, Agent, or Firm* — Greenblum & Bernstein, P.L.C.

(57) ABSTRACT

In order to avoid a collision between transport units, which are moving along a transport path of a transport assembly, and/or the collision of a transport unit with a barrier and/or the surpassing of a local speed limit, for at least one transport unit (TEi) it is preemptively determined if for the transport unit (TEi) a stopping maneuver (SMi) with a predetermined cinematic may be performed, without causing a violation of these safety requirements. In case of violation of a safety requirement, the stopping maneuver is effectively activated.

11 Claims, 5 Drawing Sheets

(51) Int. Cl.
*B61L 23/34* (2006.01)
*B61L 25/02* (2006.01)
(52) U.S. Cl.
CPC ......... *B61L 25/025* (2013.01); *B61L 2201/00* (2013.01)
(58) Field of Classification Search
CPC ...... H02K 41/00; H02K 41/02; H02K 41/025; H02K 41/03
See application file for complete search history.

(56) References Cited

U.S. PATENT DOCUMENTS

| | | | |
|---|---|---|---|
| 9,346,371 B2* | 5/2016 | King | B60L 13/003 |
| 9,771,000 B2* | 9/2017 | King | E01B 25/34 |
| 9,802,507 B2* | 10/2017 | Clark | B60L 13/003 |
| 9,882,520 B2* | 1/2018 | Huber | H02P 25/06 |
| 2016/0194182 A1* | 7/2016 | Frantzheld | B66B 21/12 |
| | | | 318/4 |
| 2017/0217460 A1* | 8/2017 | Huber | B61L 23/14 |
| 2017/0229991 A1* | 8/2017 | Huber | H02P 25/06 |
| 2018/0102681 A1* | 4/2018 | Prussmeier | H02K 1/18 |

FOREIGN PATENT DOCUMENTS

| | | |
|---|---|---|
| JP | H08-37707 | 2/1996 |
| WO | 2008/110478 | 9/2008 |
| WO | 2015/022056 | 2/2015 |

* cited by examiner

METHOD FOR OPERATING A TRANSPORT ASSEMBLY IN THE FORM OF A LINEAR STATOR LINEAR MOTOR

CROSS-REFERENCE TO RELATED APPLICATIONS

The present application claims priority under 35 U.S.C. § 119(a) of Austria Patent Application No. A50058/2016 filed Feb. 2, 2016, the disclosure of which is expressly incorporated by reference herein in its entirety.

BACKGROUND OF THE INVENTION

1. Field of the Invention

The present invention refers to a method for operating a transport assembly in the form of a long stator linear motor through which a plurality of transport units are moved along a transport path, wherein the movement of the transport units along the transport path is adjusted by setting setpoints of movement by at least one transport unit control.

2. Discussion of Background Information

Long stator linear motors are often used as flexible transport assemblies in production plants, machining plants, assembling plants and similar plants. A long stator linear motor is notoriously essentially composed of a long stator formed by a plurality of successively positioned driving coils and a plurality of transport units with excitation magnets (permanent magnets or electromagnets), which are moved along the long stator by energizing the respective driving coils with an electric current. The driving coils generate a moving magnetic field, which interacts with the excitation magnets on the transport units, in order to move the transport units. The long stator therefore forms a transport path, along which the transport units may be moved. Therefore it is possible to control the movement (position, velocity, acceleration) of each transport unit individually and independently from one another. To this end, each driving coil is controlled by an associated driving coil controller, which can obtain settings for moving a transport unit (for instance in the form of setpoints for position or velocity) from a superordinate plant control unit. Switches for the long stator linear motor may be provided along the transport path. The long stator is often formed by transport segments, wherein each transport segment forms a portion of the transport path and contains a number of driving coils. Usually a segment control is provided for a transport segment, which controls all driving coils of the transport segment. The design of the long stator linear motor, i.e. for instance the design of the driving coils, the transport path, the transport units, the guides of the transport unit, etc., and the control principle may obviously vary, wherein however the basic operating principle of a long stator linear motor remains the same.

A transport assembly provided in the form of a long stator linear motor may become complex, with a plurality of transport segments, which may also be connected to each other by means of switches. A great number of transport units may also be simultaneously moved on the same. Such a transport assembly therefore imposes high requirements on the control of the movement of individual transport units. In particular, normally, provisions have to be taken in order to avoid that single transport units do not collide during their movement.

U.S. Pat. No. 8,863,669 B2 describes a transport assembly, for example, which is formed by a long stator linear motor with a control of movement of transport units. The transport path is divided into zones, wherein a transport unit is controlled in a setpoint based zone based on a setpoint setting, and in a limit value based zone by means of settings for end position and maximum values of velocity and acceleration. In the limit value based control, these settings are transformed into a movement profile, according to which the transport unit is moved. U.S. Pat. No. 8,863,669 B2 also indicates that collisions of transport units have to be avoided, wherein no indication is provided on how this control is achieved.

In the same way, along the transport path barriers may be provided, which cannot be overridden by a transport unit. Such barriers may be real, physical barriers, such as, for example, the end of a transport segment, or logical barriers, for instance a switch, which is simultaneously occupied by another transport unit, or a transport segment in which there is no space for a further transport unit. Barriers may also be imposed, according to application, even temporarily, by the higher level plant control unit. Also barriers may not be overridden by the transport units during operation.

Not least, along the transport path local speed limits may be imposed, which may not be violated by a transport unit, for example a maximum speed in a curve, in order to avoid exceeding a maximum allowable centrifugal force.

SUMMARY OF THE EMBODIMENTS

Embodiments of the present invention provide a method, through which a collision between transport units, which are moving along a transport path of a long stator linear motor, and/or the collision of a transport unit with a barrier and/or exceeding of a local speed limit may be avoided.

According to embodiments, for at least one first transport unit it is preemptively determined, if for the transport unit a stopping maneuver with a predetermined cinematic may be performed with a predetermined cinematic, so that a collision of this transport unit with a preceding second transport unit or with a barrier of the transport path (2) is avoided, or exceeding of a predetermined local speed limitation in a position of the transport path by the first transport unit is avoided, or a matching movement of the first transport unit to a speed of a preceding second transport unit is possible, and in that the stopping maneuver of the first transport unit is effectively activated, when at least one of these conditions is violated. Due to the predictive calculation of stopping maneuvers and the simultaneous verification of violation of security requirements, it is possible to ensure that a transport unit may be stopped, without conflicting with another transport unit, a barrier, or a speed limit. If the risk of violation of a security requirement is impending, the transport unit is effectively stopped.

In a preferred embodiment, a stopping maneuver is deduced for the preceding second transport unit and it is checked, if the first transport unit in case of a presumed stopping maneuver, gets too close to the second transport unit. In the normal case, the stopping maneuver is activated as fast as possible. If a collision, during a stopping maneuver of the second preceding transport unit can be avoided, it is therefore possible to assume that during normal driving maneuvers, a collision may also be avoided.

In a simple embodiment, for the first transport unit and for the second transport unit, on the basis of the knowledge of the cinematic implementation of the respective stopping maneuver, a respective stopping point or a stopping distance are calculated and these are compared, in order to determine if the first and second transport units get too close to each other.

In order to consider fixed barriers, it may be checked, if the first transport unit, in case of a presumed stopping maneuver, gets too close to the barrier. It is therefore ensured that a transport unit may always be timely stopped before a barrier.

The safety may be increased if a minimum distance is set, which indicates how close the transport unit may get to the preceding transport unit or barrier.

The compliance with a speed limit may be easily checked, if it is checked that the speed of the first transport unit during a presumed stopping maneuver may be reduced from a current actual speed to a predetermined limited speed, imposed by the speed limit, without the first transport unit getting too close to the defined area of speed limitation. It is therefore ensured that a transport unit may always be decelerated to a defined speed, without any violation of the speed limit. In a simple implementation, for the first transport unit, based on the knowledge of the cinematic implementation of the stopping maneuver, a speed point or braking distance is calculated, and therefore it is determined if the speed of the transport unit may be reduced to the limit speed before reaching the area of speed limitation.

A collision may be avoided through a matching maneuver, if it is checked, if the speed of the first transport unit in case of a presumed stopping maneuver, may be reduced from the current actual speed to a speed of the second transport unit, so that between the first and second transport unit a safety distance is maintained, which is obtained by the concrete cinematic implementation of the stopping maneuver. It is therefore ensured that the speed of the first transport unit may always be reduced to the speed of the second transport unit, without a collision. In a simple implementation, for the first transport unit, based on the knowledge of the cinematic implementation of the stopping maneuver, a speed point or compensation distance is calculated and it is determined if the speed of the transport unit may be reduced to the speed of the second transport unit.

Other exemplary embodiments and advantages of the present invention may be ascertained by reviewing the present disclosure and the accompanying drawing.

BRIEF DESCRIPTION OF THE DRAWINGS

The present invention is described in detail in the following with reference to FIGS. 1 to 8, which schematically and illustratively show, in a non-limiting way, advantageous embodiments of the invention. In particular.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
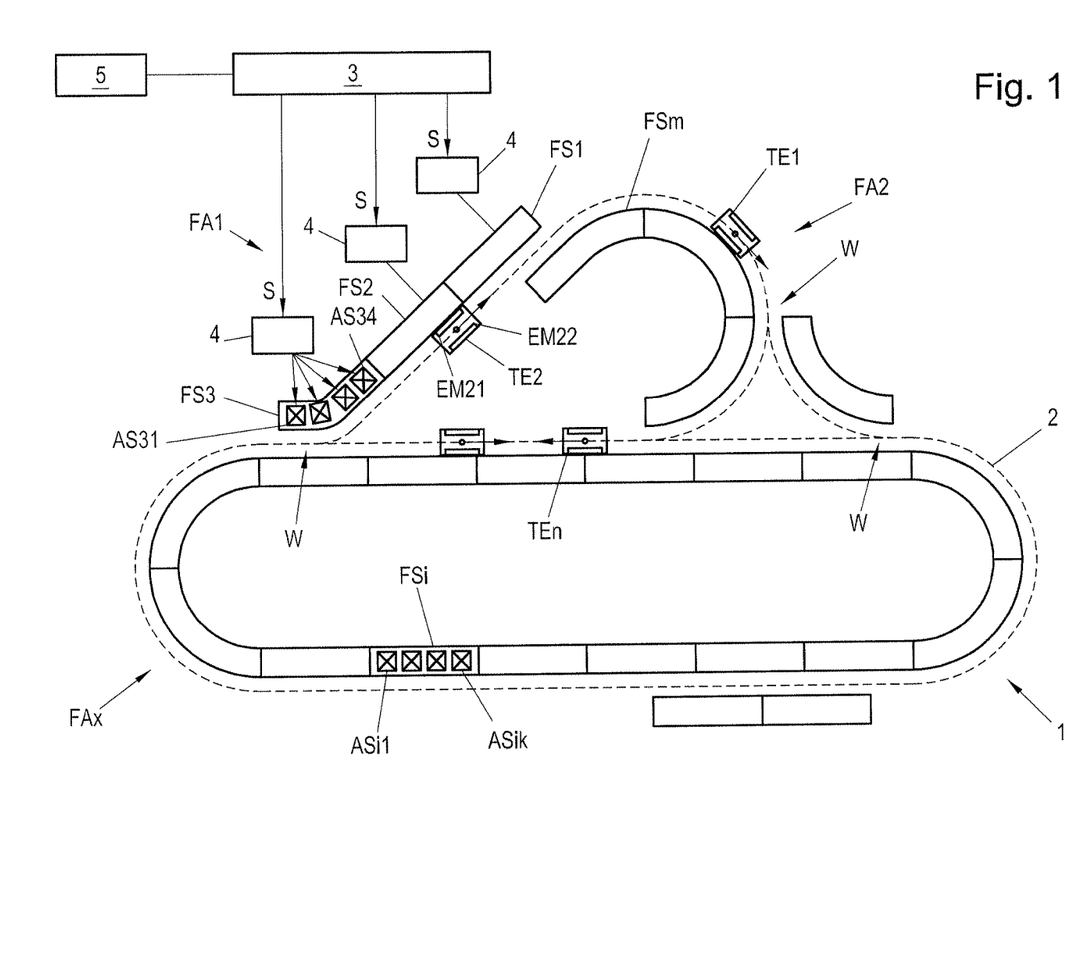
FIG. 1 shows an example of a transport assembly.

FIG. 1 shows an example of a design of a transport assembly 1 with a transport path 2 (indicated by the dashed line). The transport assembly 1 is implemented as long stator linear motor and a plurality of transport units TEi, i=1, . . . , x are provided, which may be moved along the transport path 2. The transport path 2 is defined given by the long stator of the long stator linear motor 1. In the exemplary embodiment shown, a series of transport segments FSi, i=1, . . . , y is provided, which define the path of the transport units TEi, i.e. the transport path 2. Individual transport portions FAi, i=1, . . . , z of the transport path 2 are formed by a number of adjacent transport segments FSi. The transport segments FSi, and therefore also the transport portions FAi, form a part of the long stator of the long stator linear motor. The transport segments FSi are fixed in a suitable construction and normally also provided guiding elements, along which the transport units TEi may be guided. Each transport portion FAi comprises at least one transport segment FSi, normally a plurality of transport segments FSi. Individual transport portions FAi, or transport segments FSi of individual transport portions FAi (as for example the transport segments FSI, FSm), may also partially overlap along the transport path 2, in particular at points of the transport path 2, in which the transition from a transport portion FAi to another transport portion Fai takes place (as for example from transport portion FA1 to transport portion FA2). It may also be provided that in sections on both sides of the transport path 2 transport segments are arranged. Switches W may also be provided, at which (according to the transport direction of a transport unit TEi) two transport portions FAi converge or a splitting on two transport portions FAi is provided. It is understandable that in this way an almost arbitrarily structured transport path 2 may be formed, which has not to be in a two-dimensional plane, but may also extend in three dimensions.

Each transport segment FSi comprises a number k of driving coils ASij, j=1, . . . , k, wherein the number k need not to be the same for each transport segment FSi. In FIG. 1, for clearness, only driving coils ASij of some transport segments FSi are shown. Each transport unit TEi comprises a number of excitation magnets EMij, j=1, . . . , l, preferably on both sides (with respect to the transport direction, which is indicated by arrows on the transport units TEi) of the transport unit TEi. The driving coils ASij generate a moving magnetic field and interact in operation of transport assembly 1 in a known way according to the motor principle with the excitation magnets EMij of the transport units TEi. If the driving coils ASij are electrically energized with a coil current in the area of a transport unit TEi, a magnetic flux is formed, which, by interacting with the excitation magnets EMij, creates a force on the transport unit TEi. This force may, according to the coil current, comprise, in a known way, a force component forming a thrust force and a component forming a lateral force. The thrust force component essentially provided movement of the transport unit TEi and the lateral force component may be used for guiding the transport unit TEi, but also for defining the path of the transport unit TEi in a switch W. In this way, each transport unit TEi may be moved individually and independently from each other along the transport path 2, in that the driving coils ASij are energized in the area of each transport unit TEi with a corresponding coil current according to the movement to be performed.

This fundamental functional principle of a long stator linear motor is sufficiently known, so that it is not described in further detail. For the present invention it is also irrelevant how the transport units TEi, the transport segments FSi, the driving coils ASij, the excitation magnets EMij, etc., are concretely design, whereby their detailed description is also omitted.

In order to control the individual transport units TEi a transport unit control 3 is provided, in which the setpoints S for the movement of transport units TEI are generated. Obviously a plurality of transport unit controls 3 may also be provided, which are associated to a part of the transport assembly 1, for instance to a transport portion FAi, respectively, and control the movement of the transport units TEi on this part. Additionally, segment control units 4 may also be provided, which are associated to a transport segment FSi (or even a plurality of transport segments FSi or a part of a transport segments FSi) and convert the setpoint settings of the corresponding transport unit control 3 for a transport unit TEi into coil currents for driving coils ASij of transport segments FSi, into concrete values of control variables. The segment control units 4 may however also be implemented in a transport unit control 3. The setpoints S are set as positions p of transport units TEi, or, equally, speeds v. This means that in each cycle step n of control for each transport unit TEi a new setpoint S is calculated, which is adjusted by the segment control units 4. In a segment control unit 4, a suitable controller is implemented, which converts the setpoint settings in a suitable control variable, for instance in a force or coil current. The desired movement of the transport units TEi along the transport path 2 may also be set by a transport assembly control 5, which for example performs a routing calculation (for example which path should a transport unit TEi follow?), a switch arbitration (for example which transport unit TEi may enter a switch?), a deadlock avoidance (for example, are two transport units TEi blocking each other?), etc., in order to move the transport units TEi in a desired way along the transport path 2, for example in order to execute production, assembly or other processes. These movement settings for the transport units TEi are converted in the transport units control 3 into setpoint settings for the transport units TEi.

In principle, in the transport assembly control 5 it should be ensured, that on the transport path 2, no inadmissible condition takes place. This comprises primarily the avoidance of collisions between two transport units TEi on the transport path 2. In the same way, it should be ensured that transport units TEi do not uncontrollably overpass barriers, for example uncontrollably enter switches W or a transport segment FSi, which can also lead to a collision. Moreover, the compliance with speed limits for transport units TEi may be ensured. The compliance with these safety settings (in particular the collision avoidance, but also the compliance with speed limits) is important for an undisturbed operation of the transport assembly 1.

During operation of transport assembly 1, in particular in case of large transport assemblies 1 with a high number of transport units TEi and many transport portions FAi, it may nonetheless happen, that above said safety settings are violated. In order to be able to prevent these faults in such a case, it is provided, according to the invention, that in the setpoint generation in the transport unit control 3 in each cycle step n it is verified, that no collision between two transport units TEi may take place. Additionally, for each transport unit TEi the compliance with preset speed limits may also be checked. If a collision risk and/or the risk of speed surpassing is recognized, the transport unit control 3 activates a corresponding action. The basic idea to this end is always that at any time it has to be possible to stop a transport unit TEi, without the transport unit TEi colliding with another transport unit TEi, wherein also during the stopping process, i.e. during deceleration, a collision must not take place. According to the invention it is presumed that a transport unit TEi always monitors the movement of preceding (according to the transport direction of transport unit TEi) transport units TEk, k>i, with which a collision may take place, in order to monitor the compliance with the safety settings. In the simplest case, this is the immediately preceding transport unit TEi+1, wherein also a plurality of preceding transport units TEk may be monitored. In particular, in the case of switches W a collision may also take place with a transport unit TEk coming from another transport portion FAi of the transport path 2, which need not to be the immediately preceding transport unit TEi+1. If in one time compliance with safety requirements cannot be ensured anymore for a transport unit TEi, the transport unit control 3 activates an appropriate action.

An action may be the activation of a stopping maneuver, i.e. particular or all transport units TEi are stopped, or the execution of a matching maneuver, i.e. the movement of a transport unit TEi is adapted to the movement of another transport unit TEk, in particular a directly preceding transport unit TEi+1.

The operation of monitoring the safety settings is described based on a phase space representation, whereby the safety function is in the following also called the phase space limitation. The phase space is, as known, a representation of the three states of a movement, i.e. position p, speed v and acceleration a, in a diagram. The phase space may also comprise other states, as for example the jerk (time-derivative of acceleration) and/or variation of jerk over time (second time-derivative of acceleration).

Figure 2:
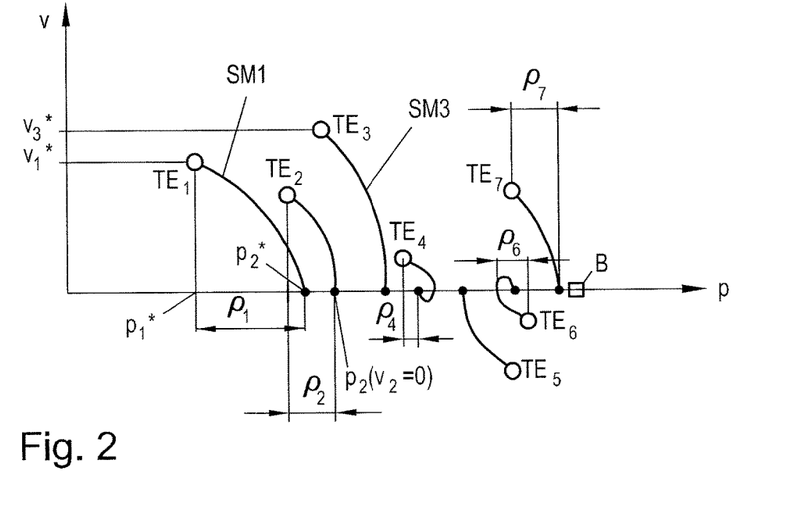
FIG. 2 shows an example of a collision avoidance through stopping maneuver according to the invention.

FIG. 2 shows the phase space projected on the plane of speed v and position p for seven transport units TEi, i=1, ... 7, which are positioned on a transport portion FAi. The transport units TEi move for example for simplicity's sake each with a constant acceleration ($a_i$=0), but with different speed $v_i$, not equal zero, and are in different positions $p_i$. The respective current position $p_i$* and speed $v_i$* are marked by circles. In each cycle step n it is now preemptively calculated if for a transport unit TEi it is possible to execute a stopping maneuver, without this transport unit TEi collides with a preceding transport unit TEk, k>i, in particular the directly preceding transport unit TEi+1. Normally the compliance with a certain safety distance may also be checked in that way. All that is behind the transport unit TEi can then be ignored, since it can be assumed that the transport units TEi behind perform the same verification. Now, for a transport unit TEi in each cycle step n for the calculated new setpoint position $p_i$ the stopping distance $\rho_i$ is calculated, therefore the distance required by the transport unit TEi to go from current speed $v_i$* to stop ($v_i$=0). The position $p_i(v_i$=0) in which the transport unit TEi stops, is also called the stopping point. Such a stopping maneuver is performed with a predetermined stopping deceleration a, which normally corresponds to the maximum possible acceleration $a_{max}$, but should not be lower than an acceleration, with which the transport unit TEi can be decelerated during a normal movement. The stopping point $p_i(v_i$=0) may be easily calculated and obviously depends from how the stopping maneuver for the transport unit TEi is cinematically implemented, which is considered known.

At this point it has to be noted that the use of setpoints S for the phase space limitation is advantageous, since these are anyway present in the transport unit control 3. In the same way, current actual values of movement of transport unit TEi may also be used for the phase space limitation. The actual values have however somehow to be detected with a measuring system or calculated, which is onerous. Moreover it is also possible to provide a lag error monitoring, which continuously monitors the deviation of actual values from setpoints S and engages, when this deviation becomes too great. Also for this reason the use of setpoints S for phase space limitation is no limitation. The use of setpoints or actual values is therefore considered equivalent.

In a simple case, a stopping maneuver, for example is executed with a constant maximum acceleration $a_{i,max}$ and the transport unit TEi is therefore decelerated until the speed $v_i=0$ is achieved. From the cinematic relationships it my easily deduced that then time $\Delta t_i$ until stopping of transport unit TEi derives from $$\frac{|v_i^*|}{a_{i,max}},$$

wherein $v_i^*$ indicates the speed at the beginning of deceleration. The stopping distance $\rho_i$ of the transport unit TEi then derives from $$\rho_i = \frac{v_i^*}{2}\Delta t \text{ or } \rho_i = \frac{v_i^* \cdot |v_i^*|}{2 \cdot a_{i,max}}.$$

Depending on the cinematic implementation of the stopping maneuver SMi the calculation of the stopping distance $\rho_i$ may also take place in another way. For example, for the stopping maneuver SMi a speed profile may be set, with which a better convergence to the end speed $v_i=0$ may be achieved. A limitation of acceleration variation may also be provided, in order generate no (excessively) jerky movements of the transport unit TEi.

In this way a criterion for executing a stopping maneuver SMi for a transport unit TEi in a cycle step n may involve checking the inequation $$p_i^* + \rho_i[+M] \le p_k^* + \rho_k$$

in order to avoid a collision with a preceding transport unit TEk. Naturally it is also possible to provide a minimum distance M to be observed. The minimum distance M may contain a safety reserve, but also the dimensions of transport unit TEi may be modelled with the minimum distance M. In the same way, the minimum distance M may also consider the lag errors (i.e. the deviation between setpoint position and actual position of transport unit TEi).

In general terms, it is checked, if the one transport unit TEi and a preceding transport unit TEk get too close to one another during a presumed stopping maneuver SMi, SMk, which for example may be checked through the stopping points $p_i(v_i=0)$, $p_k(v_k=0)$ or the stopping distances $\rho_i$, $\rho_k$. How close the transport units TEi, TEk may come, may be defined through the minimum distance M, for example. If they come too close, a stopping maneuver SMi is activated.

According to a cinematic implementation for the execution of stopping maneuver SMi, it may also happen, that the transport unit TEi cannot be stopped at the first reaching of speed $v_i=0$. An example for this is the implementation of a jerk-filter (limitation of admissible acceleration variation) formed by an averaging filter. This may lead to the fact that a transport unit TEi in fact reaches speed $v_i=0$, but the movement in this point cannot be interrupted, but has to be prolonged with an inverted velocity. Therefore the transport unit TEi in this case is forcibly moved over this inversion point $p_i(v_i=0)$ when reaching speed $v_i=0$ for the first time, and is further moved with inverted speed in the opposite direction. The implementation of the cinematic movement of the stopping maneuver then ensures that the transport unit TEi is stopped with an inverted velocity. The end point $p_i''(v_i=0)$ is then reached by repeated reaching of speed $v_i=0$. Assuming that the phase space limitation again ensures that the behind transport unit TEi does not collide with a preceding transport unit TEk, the stopping distance $\rho_i$ in this case is obtained from the minimum distance between the starting position $p_i^*$ of the stopping maneuver and the inversion point $p_i'(v_i=0)$ and end point $p_i''(v_i=0)$, therefore $\rho_i = \text{Min}\{p_i^*(v_i=0)-p_i^*, p_i''(v_i=0)-p_i^*\}$. In the same way, in this case the stopping point $p_i(v_i=0)$ of the transport unit TEi is obtained as a minimum of inversion point $p_i'(v_i=0)$ and end point $p_i''(v_i=0)$. This is shown in FIG. 2 with transport units TE4, TE6. Otherwise, in this case there is no difference from the above.

In the same way, it is irrelevant in which direction preceding transport unit TEk is moving, as indicated in FIG. 2 by means of transport units TE5 and TE6. This means also that the phase space limitation advantageously considers also transport units TEk, which move in the opposite direction. The speed $v_i$ has only to be considered with the correct sign, which is easily accomplished.

FIG. 2 also shows a barrier B. This is for example the inlet area of a switch W, which can only be passed, when the switch W is released for a transport unit TEi, for example through a superordinate transport assembly control 5. The stopping distance $\rho_B$ of a barrier B may be considered as zero and the current position $p_B^*$ of barrier corresponds therefore to a stopping point $p_B$ (v=0), wherein the position $p_B^*$ of barrier naturally is a predetermined position. In this way it is possible, for example, to use again above inequation for the checking, i.e. $p_i^* + \rho_i[+M] \le p_B^*$ in order to avoid a collision with the barrier B, wherein again a minimum distance M may be considered.

Therefore, for collision monitoring of phase space limitation an extreme case is considered, in which it is assumed that a transport unit TEk, k>i executes a stopping maneuver SMk according to a predetermined cinematic movement, for example, with a maximum possible acceleration $a_{max}$, or that on the transport path 2 a barrier B is provided, which cannot be passed. It has to be ensured then that a transport unit TEi moving behind on the transport path 2 in the transport direction may be stopped with a predetermined stopping maneuver SMi, without a collision with the preceding transport unit TEk or the barrier B. In this way, it is ensured that the transport units TEi of transport assembly 1 may be stopped at any moment, without collisions, or that the two transport units TEi, TEk or the transport unit TEi and the barrier B don't come too close to each other.

If in continuous operation the previously calculated stopping points $p_i(v_i=0)$ and $p_k(v_k=0)$ of two transport units TEi, TEk, possibly considering an inversion point p' and end point p'' as previously described, or the previously calculated stopping point $p_i(v_i=0)$ of a transport unit TEi and the stopping point $p_B(v=0)$ of a barrier B come too close to each other, possibly considering a minimum distance M, then a stopping maneuver SMi is executed for the transport unit TEi. Checking of the condition "get too close" may be executed in an adequate way, for example with the above inequalities. This stopping maneuver SMi may not directly affect the other transport units TEi of the transport assembly 1 yet, i.e. those may initially proceed their normal movement. Such a stopping maneuver SMi may however force following transport units TEi to also execute a stopping maneuver SMi. The execution of a stopping maneuver SMi may also be considered as a case of failure, which causes the stopping of a transport portion FAi or the entire transport assembly 1.

Figure 3:
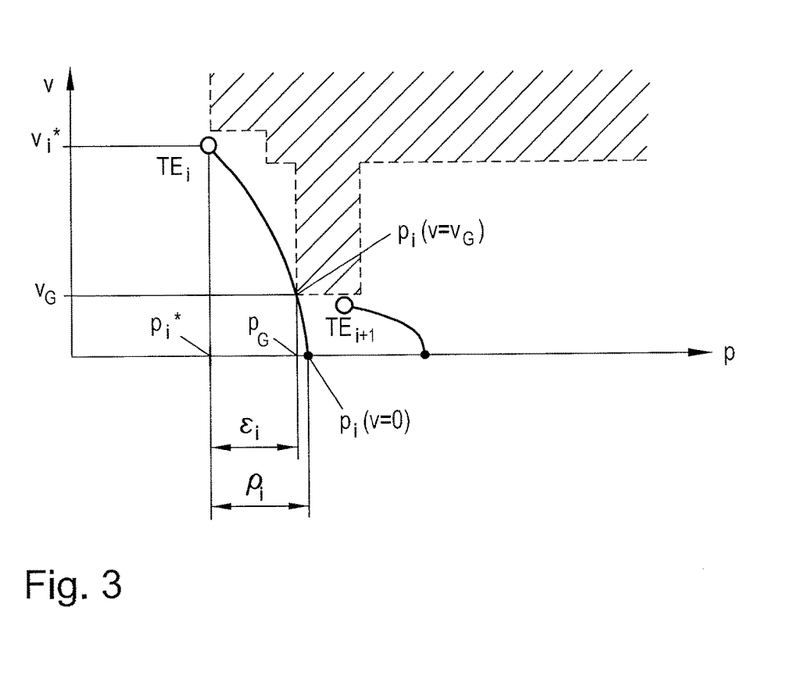
FIG. 3 shows an example of the compliance with a speed limit according to the invention.

For monitoring a speed limitation a stopping maneuver SMi of a transport unit TEi is also assumed and in each cycle step n it is preemptively checked if the speed $v_i$ of a transport unit TEi may be securely reduced with a stopping maneuver SMi from a current actual speed $v_i^*$ to the limit speed $v_G$ predetermined by the speed limitation (indicated by the dashed area in the phase space of FIG. 3), for example in an area of transport portions FAi on which the transport unit TEi is currently moving, as shown in FIG. 3. The part of the stopping maneuver SMi until reaching the limit speed $v_G$ is indicated as a braking distance $\varepsilon_i$. The braking distance $\varepsilon_i$ may be calculated again from known concrete cinematic implementation of the stopping maneuver SMi. If for example a deceleration of the transport unit TEi with a constant maximum acceleration $a_{i,max}$ is again assumed, then the braking distance is derived as $$\varepsilon_i = \frac{v_i^* - v_G}{2} \Delta t \text{ or } \varepsilon_i = \frac{(v_i^* - v_G) \cdot |v_i^* - v_G|}{2 \cdot a_{i,max}}.$$

In this way, for transport unit TEi in each cycle step n for a given speed limitation it may be checked, if the inequation $$p_i^* + \varepsilon_i[+M] \leq p_G$$

still holds, wherein $p_G$ indicates the predetermined position of the speed limitation on transport portion FAi and $p_i^*$ is the actual position of transport unit TEi. As shown, a certain minimum distance M may again be set. If above said condition cannot be met for a transport unit TEi, then for the transport unit TEi a stopping maneuver SMi for stopping the transport unit TEi is activated, which may also indicate a fault in operation of transport assembly 1. As explained above, this can also activate a stopping maneuver SMi of the following transport units TEi, as soon as the phase space limitation for these transport units TEi reacts.

Alternatively, a speed position $p_i(v_i=v_G)$ could also be calculated and checked, if the speed position $p_i(v_i=v_G)$ and the predetermined position $p_G$ of speed limitation get too close to each other, which in turn may be defined by the minimum distance.

A local speed limitation is however not necessarily statically defined, but it can be provided, that the local speed limitation is dynamically activated and deactivated, for example through the transport assembly control 5 or in a defined temporal pattern. In order to manage these dynamic speed limitations, these can initially be considered as static and may be monitored by the phase space limitation. If however it is clear or known, that for a transport unit TEi, the speed limitation will not be active until the area of speed limitation is left, then the speed limitation for transport unit TEi may be ignored.

It is also conceivable, that a speed limitation is defined only for a certain, or even more certain, transport unit TEi. In this way it could be possible, for example, to let the speed limitation be dependent from the state, for example the load, of the transport unit TEi. In case of heavy loading, for example, in a curve, a speed limitation can be valid, whereas an empty transport unit TEi has not to comply with this limitation.

It can be provided, that for certain transport units TEi the movement of the transport unit TEi is adapted, without the need, in case of conflict, to immediately execute a complete stopping maneuver SMi, i.e. to $v_i=0$. For a transport unit TEi for example only a destination position may be defined, wherein the distance to the destination may be flexibly set by the transport unit control 3, for example in the form of a particular speed profile and complying with maximum values for speed and acceleration, and optionally also for jerk or jerk variation. In this way, the transport unit control 3, in which normally the phase space limitation is also implemented, may modify the movement of the transport unit TEi whilst maintaining the destination position, in order to avoid a complete stopping maneuver SMi. The phase space limitation may execute a matching movement, so that the safety settings are met. This case may occur, for example, when the immediately preceding transport unit TEi+1 is moving in the same direction but with a lower speed $v_{i+1}$, with respect to transport unit TEi that moves with speed $v_i$. This would inevitably imply, that the phase space limitation will react sometime, since both transport units TEi, TEi+1 will eventually get too close to each other. In this case the transport unit TEi would be stopped with a stopping maneuver SMi, although a simple speed adaption of transport unit TEi would suffice.

Figure 4:
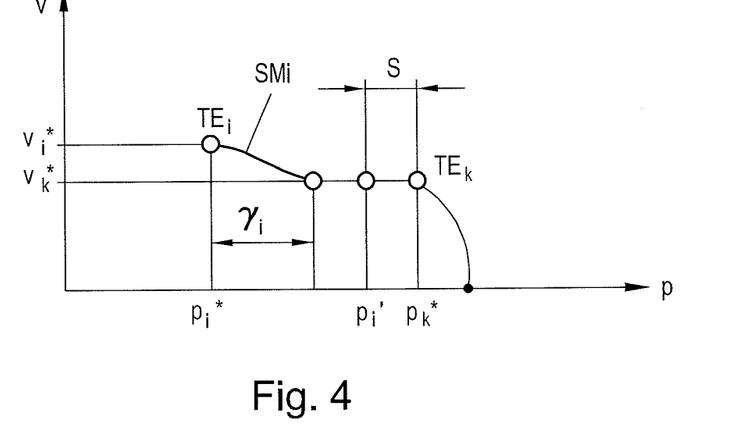
FIG. 4 shows an example of a matching movement according to the invention.

The matching movement is described with reference to FIG. 4. The transport unit TEi moves here with speed $v_i$, which is greater than speed $v_k$ of a preceding transport unit TEk. Again, a stopping maneuver SMi is assumed, which is preemptively calculated, wherein the stopping maneuver SMi of transport unit TEi in this case does not stop transport unit TEi, i.e. decelerate it to final speed $v_i=0$, but is oriented on speed $v_k$ of a preceding transport unit TEk. The stopping maneuver SMi again is performed according to a predetermined cinematic movement. The stopping maneuver SMi in a simple case, for example, takes place again with a constant maximum acceleration $a_{i,max}$. For the matching movement, preferably a cinematic movement is implemented, which ensures a possibly jerk-free matching movement, as shown in FIG. 4.

Initially (similar to calculation of braking distance c) according to the concrete cinematic implementation of stopping maneuver SMi the matching distance $\gamma_i$ is calculated, which is required for braking the transport unit TEi according to the cinematic implementation of the compensation movement from speed $v_i$ to speed $v_k$ of a preceding transport unit TEk. In the same way, again a speed position $p_i(v_i=v_k)$ could be calculated, and used for the checking.

Now, the phase space limitation preferably fulfills two conditions. On one side both transport units TEi, TEk during a matching movement should not get so close, that due to phase space limitation, a stopping maneuver SMi as described with reference to FIG. 1 is activated. This is indicated in FIG. 4 by position $p_i'$ and starting position $p_k^*$ of transport unit TEk when the transport unit TEi has reached speed $v_k$. Therefore a safety distance S is set, which after execution of matching movement, has to be at least maintained between both transport units TEi, TEk, so that the transport unit TEi is not stopped. At the same time, the safety distance S should be so long, that in case of a deceleration of the preceding transport unit TEk with an acceleration which is higher than the acceleration for decelerating the transport unit TEi (i.e. both transport units TEi and TEk get closer to each other during deceleration), the activation of a stopping maneuver SMi for stopping the transport unit TEi is avoided. The safety distance S may be determined through knowledge of the cinematic implementations of movements of transport units TEi, TEk.

In this way a matching movement may be activated, for example, if the condition $$(p_k^* - p_i^*) - \gamma_i [+M] \leq S$$

is violated. In this way it can be ensured that a matching movement can be executed without the phase space limitation activating a stopping maneuver SMi for stopping the transport unit TEi. The matching movement may be easily implemented in the transport unit control 3 in an advantageous embodiment for example in that for the transport unit TEi a new maximum speed $v_i = v_k$ is set.

If the matching movement is cinematically implemented in a different way, rather than a stopping maneuver for stopping the transport unit TEi, for example, because a soft approaching to the final speed $v_k$ is desired, a further improvement potential may be utilized. It is assumed that the preceding transport unit TEk during the matching movement executes a stopping maneuver SMk. In this case, the transport unit TEi would initially execute the soft matching movement, until the phase space limitation kicks in, and the transport unit TEi is stopped with a stopping maneuver SMi. If the transport unit TEi had immediately performed a stopping maneuver SMi, then it would have come earlier to a stop, whereby instead of the matching movement at a later time a stopping maneuver SMi could have been immediately executed. In this way the transport assembly 1 would possibly transition later in an undesired failure state, which can be sufficient to let potential conflict situations along the transport path 2 to automatically solve, before the phase space limitation kicks in.

Figure 5:
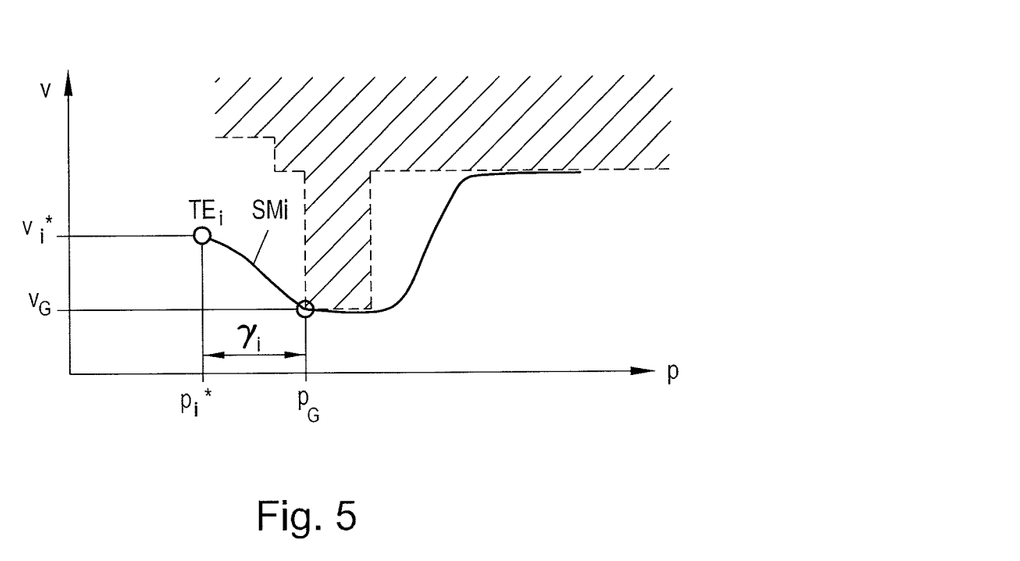
FIG. 5 shows the compliance with a speed limit through a matching movement.

Also a locally defined speed limitation may also be treated with a matching movement, as described in FIG. 5. If on the transport path 2 a speed limitation to speed $v_G$ is provided, then a matching movement with a matching distance $\gamma_i$ is executed for example, if the condition $$(p_G^* - p_i^*) - \gamma_i [+M] \leq S$$

is violated. A minimum distance M and/or a safety distance S may again be considered. After the speed limitation, the speed of transport unit TEi may be increased again, if necessary, for example through setting in the transport unit control 3, as shown in FIG. 5.

Figure 6:
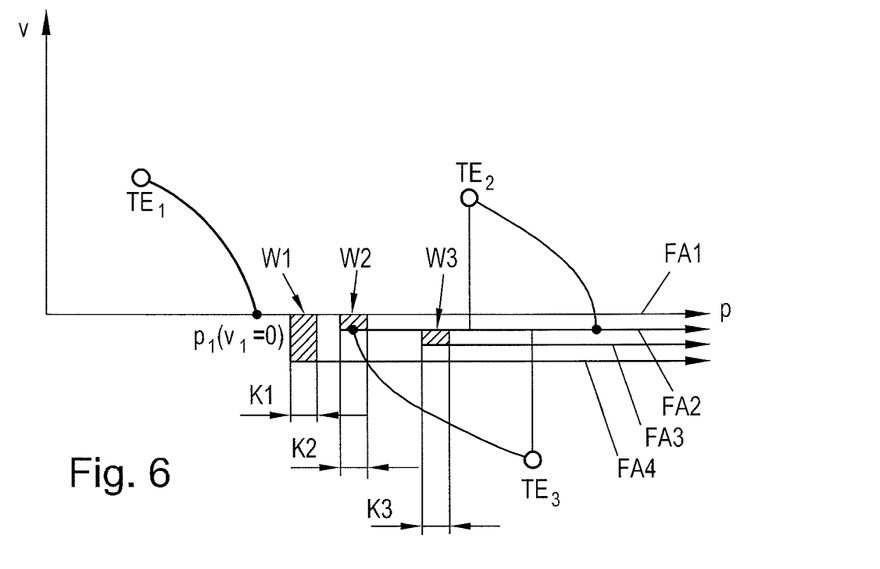
FIGS. 6 and 7 show the management of switches during monitoring of safety settings and FIG. 8 shows the implementation of a transport unit control with a phase space limitation.
Figure 7:
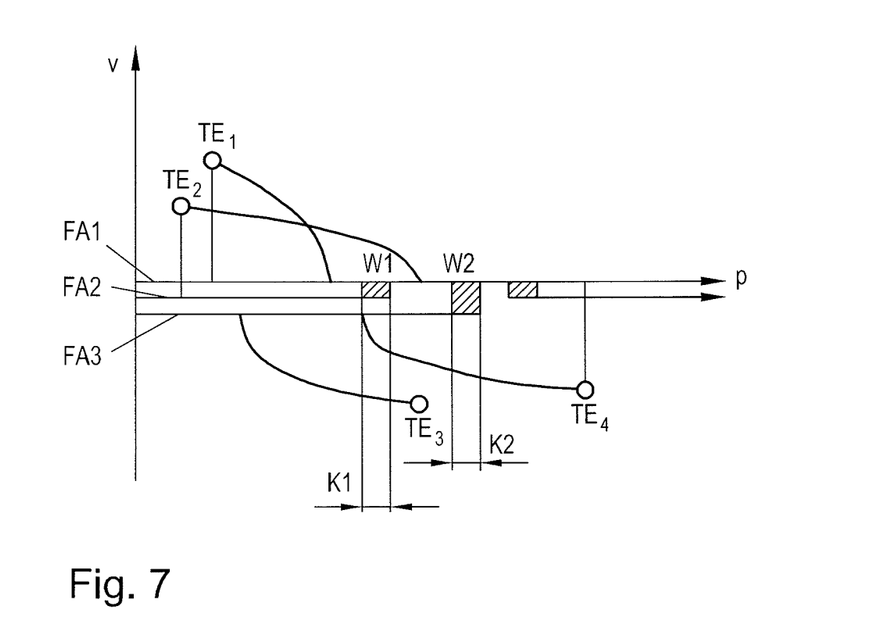

With above explained concepts switches W may also be treated, as described by means of FIG. 6 and FIG. 7. A conflict zone K is assigned to a switch W, inside which only a stopping point $p_i(v_i=0)$ of a single transport unit TEi may be present, since otherwise in case of stopping maneuvers SMi a collision between transport units TEi in the switch area may happen. For managing switches the stopping maneuvers SMi of transport units TEi are preemptively calculated and evaluated.

FIG. 6 shows, from the point of view of the transport direction of transport unit TE1 diverging switches W1, W2, W3 with assigned conflict zones K1, K2, K3, at which the transport unit TEi may select between a plurality of transport portions FA1, FA2, FA3, FA4 of transport path 2. A transport unit TE2 with the same transport direction as the transport unit TE1, but on a transport portion FA2, on which the transport unit TE1 shall not be moved, can be ignored, since no collision can take place. A transport unit TE3 with opposed movement direction is however treated as if it is positioned on the same transport portion FA1 as transport unit TE1. Additionally, it has also to be ensured that in case of stopping maneuvers SMi, only one of the two transport units TE1, TE3 may enter the conflict zone K2 of switch W2, which is assigned to both transport portions FA1, FA2. Otherwise above said phase space limitation ensures that both transport units TE1, TE3 do not collide on the transport portion FA1.

FIG. 7 shows, from the point of view of the transport direction of transport unit TE1 converging switches W1, W2, with assigned conflict zones K1, K2, where transport units TEi from a plurality of transport portions FA1, FA2, FA3 are converged onto a transport portion. A transport unit TE3 on another transport portion FA3 than the transport unit TE1 and with a transport direction which is opposite to transport unit TE1, can be ignored, since no collision can happen. A transport unit TE4, which moves on the same transport portion FA1 as transport unit TE1, but in the opposite transport direction has to be considered. If for instance the transport unit TE4 should move at switch W1 on the same transport portion FA1 as the transport unit TE1, above said phase space limitation kicks in. If the transport unit TE4 should move in the switch W1 on another transport portion FA2, then only one of both transport units TE1, TE4 in case of a stopping maneuver SM1, SM4 may enter the conflict zone K1 of switch W1, which is assigned to both transport portions FA1, FA2. A transport unit TE2, which moves in the same direction as transport unit TE1, but on another transport portion FA2, has also to be considered, if both transport portions FA1, FA2 converge at a switch W1. In this case, only one of the two transport units TE1, TE2 can enter, in case of a stopping maneuver SM1, SM2, the conflict zone K1 of switch W1, which is assigned to both transport portions FA1, FA2.

The treatment of switches W1, W2, W3, as described above, may for example be handled through setting barriers B for certain transport units TEi. If a collision may take place between two transport units TEi in the switch area or in a conflict zone K of a switch W in case of stopping maneuvers SMi, then for one of transport units TEi involved, a barrier B may be set, whereby the normal phase space limitation ensures that this transport unit TEi does not pass barrier B. Barrier B may be removed again, if the collision risk is absent again. Therefore switches do not need further mechanisms for phase space limitation, as those explained above. Only a program logic has to implemented, which executes the setting and removing of temporary barriers B according to above said conditions.

The phase space limitation may naturally also use knowledge regarding the transport path 2. There may be transport portions FAi, for example, where no stopping maneuver SMi may take place. An example is a transport portion FAi in which a mechanical coupling with a robot exists, since the robot executes work on a piece on a transport unit TEi. In this case, for example a matching movement could be delayed, since it has not to be considered that a preceding transport unit TEk executes a stopping maneuver SMk in such a transport portion FAi.

In the same way, the phase space limitation could use knowledge of a superordinate transport assembly control 5, with routing calculations, switch arbitration, deadlock avoidance, control of temporary barriers, etc. Assuming that the phase space limitation causes for a transport unit TEi a stopping maneuver SMi (also as a matching movement) on the basis of a set temporary barrier B, however knows, that this barrier B will certainly open in the near future. Then the phase space limitation may also avoid such a stopping maneuver SMi. An example for this may be the control of access of a transport unit TEi to a transport segment FSi through temporary barriers B. The access of a transport unit TEi is preemptively controlled, for example in the transport assembly control 5. The phase space limitation avoids passing of barrier B. The set barrier B may then forward to the phase space limitation also the information, about when the barrier is safely removed again, for example because a preceding transport unit TEk will have safely left the transport segment FSi. In this way, the phase space limitation for a transport unit TEi may activate a stopping maneuver SMi in spite of a set barrier B optionally later, since it is clear, that a preceding transport unit TEk will have left the transport segment FSi, before the transport unit TEi enters with the stopping maneuver the transport segment FSi (and therefore no barrier B would be set anymore).

Similarly, assumptions regarding the planned or executed movement of other transport units TEi may help to improve different interventions by the phase space limitation. If for example it is sure, that the transport unit TEk of FIG. 4 will accelerate sufficiently, then this can cause the phase space limitation to avoid activating the matching maneuver at all.

In a simplified embodiment, it may also be envisaged to not check for a transport unit TEi the compliance of safety requirements by means of the stopping maneuver SMi in each cycle step n, but at longer intervals, for example only after each x-th cycle step x·n.

Figure 8:
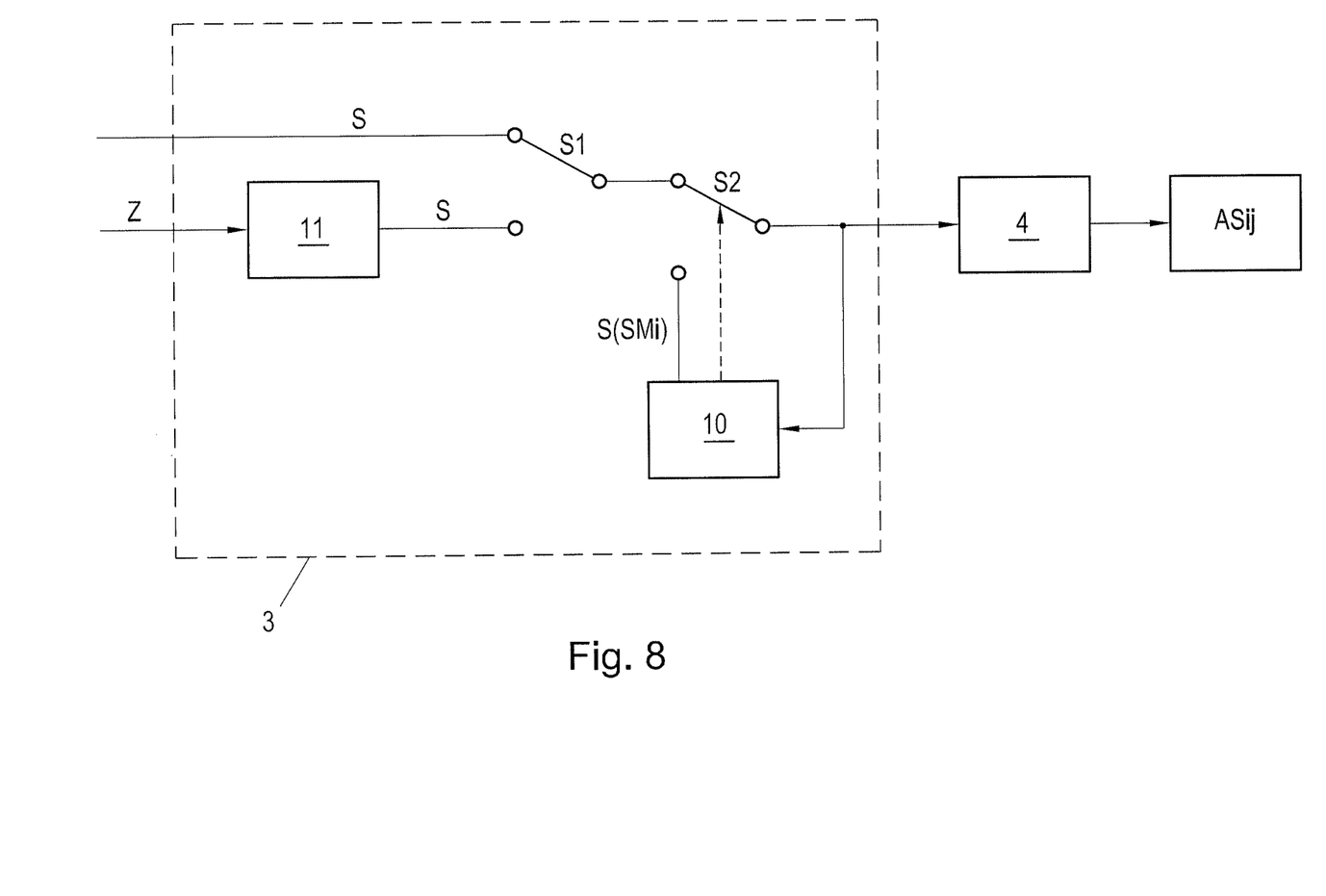

The implementation of monitoring the safety requirements may for example be implemented as schematically shown in FIG. 8. In this case it is assumed that the phase space limitation 10 is implemented in a transport unit control 3. The transport unit control 3 either receives directly setpoints S for moving a transport unit TEi, for example from a superordinate transport assembly control 5, or receives a target setting Z for movement, for example a target speed or a target position. If a target setting Z is set, then also a movement profile unit 11 may be provided in the transport unit control 3, which converts the target setting Z in setpoints S of movement, for example in the form of a speed profile. These alternative possibilities are indicated in FIG. 8 by the toggle S1. The setpoint S is used for controlling the drive coils ASij, for example through a segment control unit 4.

The setpoint S is however also used in a phase space limitation 10, in order to monitor the compliance with the safety settings for a transport unit TEi, as described above. To this end it is assumed, that the phase space limitation 10 has all information required, as for example the knowledge about the movement of preceding transport units TEk, local speed limits, barriers, etc. If the phase space limitation 10 kicks in on the basis of the setpoint S, then the phase space limitation 10 engages and conducts a stopping maneuver SMi for the transport unit TEi. To this end, the phase space limitation 10 sets the setpoints S(SMi) for the stopping maneuver SMi. This is indicated by the toggle S2 in FIG. 8. The stopping maneuver SMi may cause, as explained, the stopping of the transport unit TEi, or may also be implemented as matching movement.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A method for operating a transport assembly in the form of a long stator linear motor, in which a plurality of transport units are moved along a transport path, comprising:
controlling the movement of the transport units along the transport path by setting setpoints of movement through at least one transport unit control;
preemptively determining for at least one first transport unit if a stopping maneuver for the transport unit is executable with a predetermined kinematic, so that
a) a collision of this transport unit with a preceding second transport unit or with a barrier of the transport path is avoided, or
b) exceeding a predetermined local speed limitation in a position of the transport path by the first transport unit is avoided, or
c) a matching movement of the first transport unit to a speed of a preceding second transport unit is possible; and
when at least one of a), b) or c) is violated, effectively activating a stopping maneuver of the first transport unit.

2. The method according to claim 1, wherein for the preceding second transport unit, the method further comprises checking a stopping maneuver if, during an assumed stopping maneuver, the first transport unit is within a predetermined minimum distance to the second transport unit.

3. The method according to claim 2, wherein for the first transport unit and for the second transport unit based on knowledge of a kinematic implementation of a respective stopping maneuver, the method further comprises calculating and comparing a stopping point or a stopping distance in order to determine, if the first transport unit and the second transport unit are within the predetermined minimum to each other.

4. The method according to claim 1, further comprising checking if the first transport unit during an assumed stopping maneuver is within a predetermined minimum distance to the barrier.

5. The method according to claim 2, further setting a minimum distance, which indicates how close the transport unit can get to the preceding transport unit or the barrier.

6. The method according to claim 1, further comprising checking if the speed of the first transport unit during an assumed stopping maneuver is reducible from a current actual speed to a limit speed set by the speed limitation, without the first transport unit getting within a predetermined minimum distance to the defined area of speed limitation.

7. The method according to claim 6, wherein, from knowledge of the kinematic implementation of the assumed stopping maneuver, the method further comprises calculating a speed point or a braking distance for the first transport unit and determining if the speed of the transport unit is reducible to the limit speed before the area of speed limitation.

8. The method according to claim 6, further comprising setting a minimum distance, which indicates how close the transport unit may get to the area of speed limitation.

9. The method according to claim 1, further comprising checking if the speed of the first transport unit in case of an assumed stopping maneuver is reducible from a current actual speed to a speed of the second transport unit, so that between the first transport unit and the second transport unit a safety distance, which is obtained from the concrete kinematic implementation of the stopping maneuver is maintained.

10. The method according to claim 9, wherein, from knowledge of the kinematic implementation of the stopping maneuver, the method further comprises calculating a speed point or a matching distance for the first transport unit and determining if the speed of the first transport unit is reducible to the speed of the second transport unit.

11. The method according to claim 9, wherein a minimum distance to be maintained is considered in addition to the safety distance.

* * * * *